United States Patent [19]

Lazes

[11] Patent Number: 4,733,554

[45] Date of Patent: Mar. 29, 1988

[54] HYDRO PRESSURE THREAD TESTER

[76] Inventor: Richard Lazes, 2748 Orchid, New Orleans, La. 70119

[21] Appl. No.: 807,756

[22] Filed: Dec. 11, 1985

Related U.S. Application Data

[63] Continuation-in-part of Ser. No. 698,030, Feb. 4, 1985, Pat. No. 4,617,823.

[51] Int. Cl.$^4$ ............................................. G01M 3/28
[52] U.S. Cl. ................................................... 73/46
[58] Field of Search ............. 73/40, 49.1, 49.5, 40.5 R, 73/46

[56] References Cited

U.S. PATENT DOCUMENTS

| | | | |
|---|---|---|---|
| 2,241,526 | 5/1941 | Rosenkranz | 73/46 X |
| 3,199,598 | 8/1965 | Loomis | 73/49.1 X |
| 3,478,577 | 11/1969 | Hauk | 73/49.1 |
| 3,503,249 | 3/1970 | Dumond | 73/49.1 |
| 3,795,138 | 3/1974 | Hasha | 73/46 |
| 4,081,990 | 4/1978 | Chatagnier | 73/49.1 X |
| 4,548,069 | 10/1985 | Nousak | 73/49.1 X |

Primary Examiner—Stewart J. Levy
Assistant Examiner—Joseph W. Roskos
Attorney, Agent, or Firm—George A. Bode

[57] ABSTRACT

An apparatus for testing the connection between a segment of pipe and a coupling comprising a cylindrical body member adapted to be inserted inside one end of the pipe segment, the body member having provided therein a plurality of hydrostatically operated pressure resistant sealing packers that are spaced apart and are forced laterally outwardly of the cylindrical body and into contact with the inner surface of the pipe segment and coupling, thereby sealing off the interior of the pipe segment so as to isolate a test fluid introduced under pressure in the annular space created between the sealing packers; and an inlet port in one end of the cylindrical body member and a fluid passageway provided longitudinally within the cylindrical body member and communicating with the inlet port and the annular space for admitting test fluid under pressure into the annular space.

5 Claims, 6 Drawing Figures

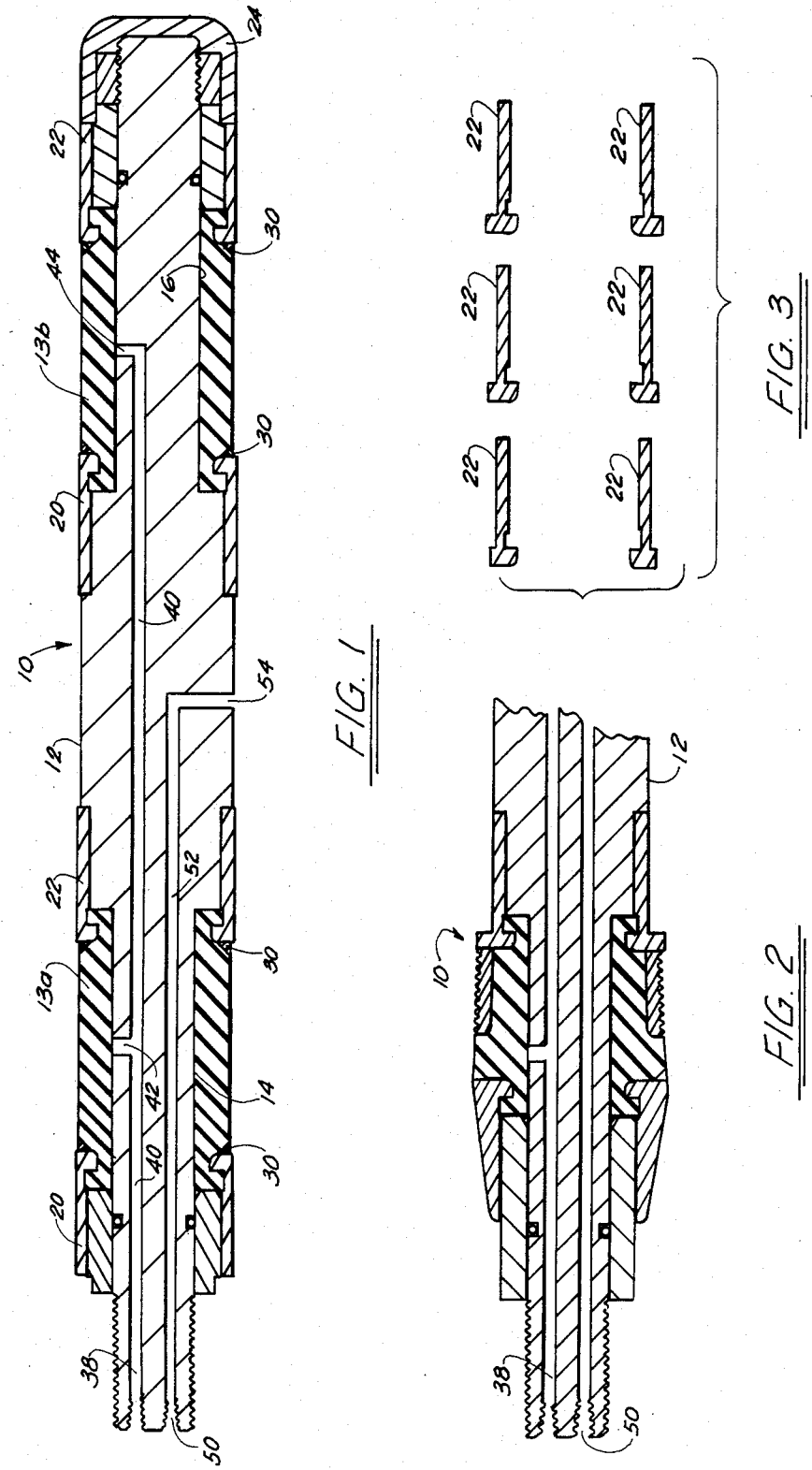

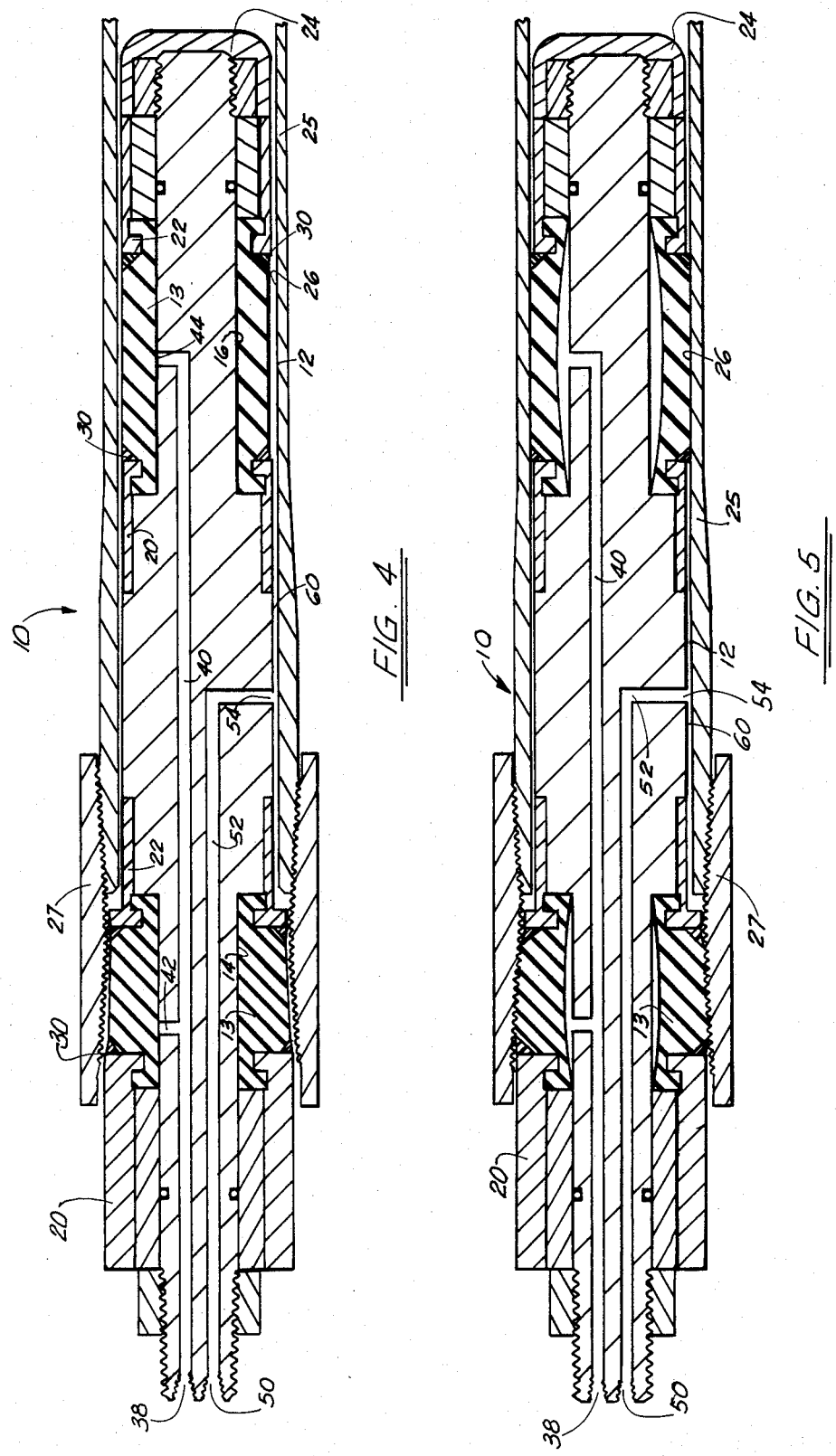

HYDRO PRESSURE THREAD TESTER

This application is a continuation-in-part application of a previous application by the same inventor bearing U.S. Ser. No. 698,030 filed Feb. 4, 1985 and now U.S. Pat. No. 4,617,823. The entire previous application Ser. No. 698,030 is incorporated herein by refernce as if set forth in full below.

BACKGROUND OF THE INVENTION

1. Field of the Invention

The current invention relates to an apparatus employed to seal off the interior of tubular members such as a cylindrical pipe or coupling. This relates to an apparatus which in one application is employed to seal off a particular section of pipe by using two of these such devices spaced apart and filling the annular space created between them with a liquid or gas under high pressure in order to check the strength of the pipe's outer wall. In another application these "packers" are used to seal off the inside diameter (I.D.) of a pipe and the inside diameter of a coupling that is screwed onto that pipe, thus creating an annulus between them which includes the "made up" connection. Fluid is then injected into this annulus to test the integrity of the connection between the male threads on the pipe and the female threads on the coupling.

2. General Background

In the oil and gas production industry tubing sections of threaded pipe are joined end-to-end, i.e. pin to box end, to convey fluids. It is desirable that the joints be strong and of tight fit and that the body wall be strong enough to withstand relatively high internal pressures. It is common practice in the oil and gas industry to plug off the ends of each particular joint by screwing test plugs onto the respective threaded ends and to fill the inside of the pipe with a fluid under high pressure to check for leaks behind the collar. Evidence of any leaks when pressured up to a standardized test pressure is an indication that either the external threads on the pin end or the internal threads on the coupling were improperly machined and thus not mating properly, or that they may not have been screwed together with adequate torque or that the body wall was of insufficient strength to withstand the pressure. This test procedure is followed to simulate "down hole" conditions when there is pressure exerted on the connections.

This procedure is very inefficient due to the need to fill up the entire inside of the full length of the tubing with fluid. Often the same pipe is pressure tested several times at the mill, at the threading facility and in the storage yard. After the full length of the body has been tested at the mill, subsequent tests are only necessary to check the integrity of the threaded connections or the coupling connection. Full length pressure testing with screw and plugs is inefficient, time consuming and very dangerous due to the large volume of water combined with the high test pressures. Test plugs sometimes blow out causing great physical damage to equipment and personnel. There is also potential gauling damage to the threads on the pipe which are screwed into the mated test plugs.

The apparatus of the present invention is used to perform a similar pressure test on the pipe threads, but due to the isolation of the annular space to the connection area has radically reduced the volume and surface area that is exerted upon the plug. The innovation of design of the present invention has eliminated the safety hazard of conventional pressure testing and at the same time streamlined the efficiency of the testing procedure requiring only small volume, high pressure pumps and only small quantities of test fluid. Resulting equipment needed to operate these plugs is a small fraction of the size, weight, and cost of those types of pumping, power and water storage units associated with conventional pressure testing.

The apparatus of the present invention is also used to test the made up connections on tubing strings as they are being assembled at the rig site. As each joint is screwed to the one below it on the rig floor, the apparatus of the present invention is inserted into the pipe and set in such a manner that one of the plugs is directly below each threaded connection and the other plug is directly above the connection. The annulus created between these two plugs or packers is then filled and pressured with a fluid to test the integrity of the made up connection. Due to simplified design of the apparatus of the present invention and the reduced volume of test fluid needed to fill the contained annulus, it is possible to operate this equipment with pumps that are a fraction of the size used with conventional methods.

PRIOR ART STATEMENT

U.S. Pat. No. 2,663,183 issued to F. Huhn and is entitled "Tube Testing Apparatus." This patent discloses a tester adapted to be screwed into the open end of a pipe coupling which is in turn screwed onto the threaded end of a tube or well casing.

U.S. Pat. No. 2,241,526 issued to M. Rosenkranz and is entitled "Pipe Joint Tester" and discloses an apparatus for testing a pipe joint by confining fluid under pressure to the joint area. This device also comprises, as with the Huhn, U.S. Pat. No. 2,663,183, a tester member having seal members spaced apart so as to seal off the area of the pipe connection to be tested and, after the seal is effected, providing a testing fluid internally to the joint through a passageway arranged axially in the body member.

U.S. Pat. No. 2,246,885 issued to G. H. Jones and is entitled "Pipe Joint Tester" and discloses a device for testing the joint by introducing interiorly of the joint to be tested fluid under pressure which is confined solely to the joint area.

U.S. Pat. No. 2,695,632 issued to M. C. Brock and is entitled "Coupling Tester" and discloses an apparatus for testing tool joints providing a mandrel with an axial bore closed at one end, sealing members to engage the interior wall of the pipe proximate either end thereof and laterally communicating ports in the mandrel such that it communicates test fluid to the connections securing the tool joint to the pipe.

U.S. Pat. No. 3,034,339 issued to P. A. Gawlik and is entitled "Tool For Detecting Pipe Leaks."

U.S. Pat. No. 4,136,552 issued to M. M. Hasha and is entitled "Leak Testing Method And Apparatus For Tubular Members And Packer Means Therefor."

U.S. Pat. No. 4,152,926 also issued to M. M. Hasha and is entitled "Method And Apparatus For Testing The Connections Between Pipe Segments."

U.S. Pat. No. 3,653,254 issued to T. A. Simon and is entitled "Leak-Testing Internal Seals And Pipe Joints."

BRIEF DESCRIPTION OF THE DRAWINGS

For further understanding of the nature and objects of the present invention, reference should be had to the following detailed description taken in conjunction with the accompanying drawings, in which like parts are given like reference numerals and wherein:

FIG. 1 is an elevational view in section of the preferred embodiment of the apparatus of the present invention arranged for down hole testing of the present invention;

FIG. 2 is an elevational view, partly in section, of the preferred embodiment of the apparatus of the present invention as it is adapted to test a mill end connection with one packer sealing in the internal diameter (I.D.) of the pin and the other in the I.D. of the coupling;

FIG. 3 is an elevational view of the various interchangeable weight rings which are used to adapt the apparatus of the present invention to test the various different weights of pipe;

FIG. 4 is an elevatioal view of the preferred embodiment of the apparatus of the present invention showing the apparatus inserted inside a "made up" connection as it would be used to test that connection, this FIGURE showing the apparatus in its "inactive" position;

FIG. 5 is an elevational view of the preferred embodiment of the apparatus of the present invention shownning the apparatus of FIG. 4 in the active or "testing" position; and, FIG. 6 is an elevational view, partly in section, of the preferred embodiment of the apparatus of Ser. No. 698,030, now U.S. Pat. No. 4,617,823 issued Oct. 21, 1986, in its operational state wherein it is inserted inside a coupling and pipe that are already assembled together.

DETAILED DESCRIPTION OF THE PREFERRED EMBODIMENT

Figure 6:
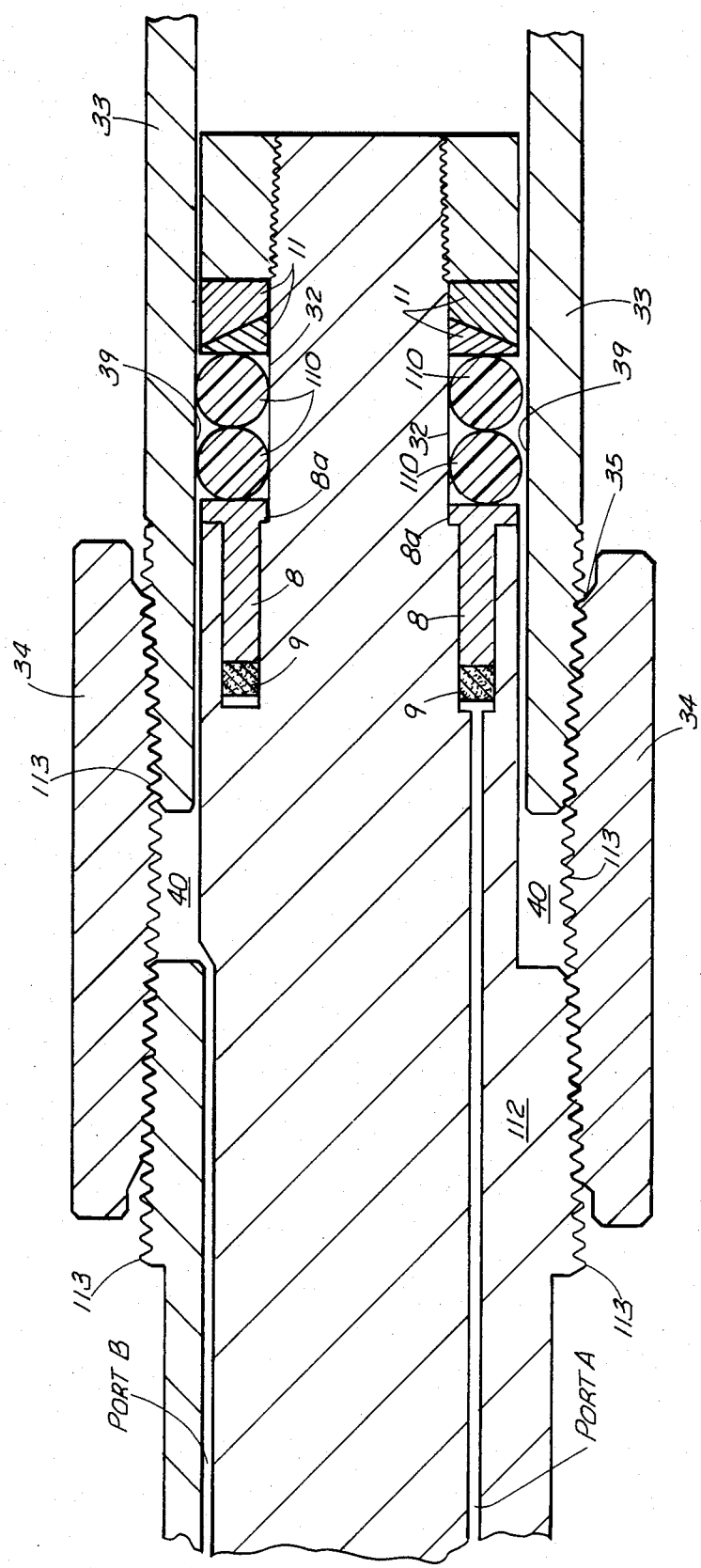

Cylindrical body member 12 of apparatus 10 of the present invention is milled out to accept notched cylindrical hard rubber sleeves or packers 13 in two separate annular grooves 14, 16. Pairs of threaded and flanged clamps 20, 22 are screwed into externally threaded body member 12 and secured by threaded end cap 24 in such a manner as to stretch and squeeze the rubber sleeves 13 against the outside wall of apparatus 10. Beveled nylon expanding anti-extrusions rings 30 are inserted at either extremity of rubber sleeves or packers 13 to prevent them from extruding out once the system is energized.

Apparatus 10 is inserted inside a pipe 25 and coupling 27 connection to be tested and pressurized fluid is injected at inlet 38 an through passageway 40 which is connected to openings 42, 44 directly beneath rubber sleeves 13a, 13b respectively. Since rubber sleeves 13 are clamped to body member 12 of apparatus 10 by squeeze clamps 20, 22, the interior pressure forces the rubber to balloon out and come into contact with the interior surface 26 of pipe 25 into which apparatus 10 has been inserted, best seen in FIGS. 4 and 5. Once these sleeves or packers 13 have been properly energized, inlet 38 of passageway 40 is closed off with a valve (not shown) to hold that pressure on the sleeves or packers 13. At this point water or gas is injected at inlet port 50, through passageway 52 to outlet port 54 and into the annulus 60 within the pipe segment 25 to be tested and created between the two rubber sleeves or packers 13. Once this pressure has reached a predetermined test pressure, port 50 is also closed and the entire pressure is left to set for a predetermined length of time to test the pipe 25 into which apparatus 10 has been inserted. After the test has been completed, seals 13 are deactivated.

To avoid confusion by duplication of numbering between new FIG. 6 of this application and FIG. 3 of the parent application incorporated by reference (Ser. No. 698,030 now U.S. Pat. No. 4,617,823 issued Oct. 21, 1986), the following explanation is provided: Seal rings 110 of FIG. 6 of this application are identical to seal rings 10 of FIG. 3 of the parent; Apparatus 112 of FIG. 6 of this application is identical to apparatus 12 of FIG. 3 of the parent; and, external threads 113 of FIG. 6 of this application is identical to external threads 13 of FIG. 3 of the parent.

What is claimed as invention is:

1. An apparatus for testing the connection between a segment of pipe and a coupling comprising:
    a. a cylindrical body member adapted to be inserted inside one end of said pipe segment, said body member having provided therein a plurality of hydrostatically operated pressure resistant first sealing means that are spaced apart and that contact at each end thereof means for preventing the extrusion of said first sealing means during testing, said preventing means arranged annularly of said cylindrical body member between said first sealing means and the first end portion of clamping means provided internally and longitudinally of said cylindrical body member, thereby forcing said first sealing means laterally outwardly of said cylindrical body and into contact with the inner surface of said pipe segment and coupling being tested, thereby sealing off the interior of said pipe segment so as to isolate a test fluid introduced under pressure to the area surrounding the connection between said pipe and said cylindrical body member and between said spaced apart first sealing means;
    b. a cylindrical nipple-like second pressure resistant sealing means arranged at one end of said cylindrical body member that threadably engages exposed interior threads of said coupling; and,
    c. means for admitting test fluid under pressure into the annular space created between said hydrostatically activated first sealing means and said cylindrical nipple-like second sealing means, said means for admitting test fluid including a first fluid passageway provided longitudinally of said cylindrical body member for introducing said testing fluid under pressure into said annular space.

2. The apparatus of claim 1, further comprising means for confining said test fluid under pressure to the connection area between said pipe segment and said cylindrical body member.

3. The apparatus of claim 1, wherein said second sealing means comprises a metal-to-metal seal formed by the external threads of said apparatus threadably engaging the interior threads of said coupling.

4. The apparatus of claim 1, wherein said testing device creates an internal seal on the interior surface of said pipe whereby said testing fluid under pressure is confined to said connection area.

5. The apparatus of claim 1, wherein said means for admitting test fluid under pressure into said annular space, further includes a second passageway in fluid communication with said first passageway and extending transversely through at least a portion of said cylindrical body member and an inlet port in fluid communication with said first passageway and a source of fluid under pressure.

* * * * *